United States Patent
El Defrawy et al.

(10) Patent No.: US 10,691,754 B1
(45) Date of Patent: Jun. 23, 2020

(54) STAGS: SECURE, TUNABLE, AND ACCOUNTABLE GENERIC SEARCH IN DATABASES

(71) Applicant: HRL Laboratories, LLC, Malibu, CA (US)

(72) Inventors: Karim El Defrawy, Santa Monica, CA (US); David W. Payton, Calabasas, CA (US); Joshua W. Baron, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 540 days.

(21) Appl. No.: 15/213,351

(22) Filed: Jul. 18, 2016

Related U.S. Application Data

(60) Provisional application No. 62/194,077, filed on Jul. 17, 2015.

(51) Int. Cl.
| | |
|---|---|
| *G06F 16/00* | (2019.01) |
| *G06F 16/9038* | (2019.01) |
| *H04L 29/06* | (2006.01) |
| *G06F 21/60* | (2013.01) |
| *G06F 21/62* | (2013.01) |
| *G06F 16/9535* | (2019.01) |

(52) U.S. Cl.
CPC ...... *G06F 16/9038* (2019.01); *G06F 16/9535* (2019.01); *G06F 21/602* (2013.01); *G06F 21/6218* (2013.01); *H04L 63/0428* (2013.01)

(58) Field of Classification Search
CPC .................................................. G06F 16/9038
See application file for complete search history.

(56) References Cited

U.S. PATENT DOCUMENTS

| | | | | |
|---|---|---|---|---|
| 2008/0071785 | A1* | 3/2008 | Kabra | G06F 21/6227 |
| 2009/0132471 | A1* | 5/2009 | Brown | G06F 17/30306 |

(Continued)

OTHER PUBLICATIONS

Steven M. Bellovin, et at, IARPA SPAR BAA Appendix E: Automatic Privacy Protection (APP) Program Results. URL https://www.tho.gov/utils/view?id=32750071e5cf4afc3b7e973d608e657e, Oct. 2010.

(Continued)

*Primary Examiner* — Dinku W Gebresenbet
(74) *Attorney, Agent, or Firm* — Tope-McKay & Associates

(57) ABSTRACT

Described is a system for secure database searching. The system comprises a client-server architecture which allows a client to securely search a database of records possessed by a server. A database query is generated by the client and transmitted to the server. The database query is processed by the server using a privacy-preserving search protocol. An encrypted match result is produced by the server without decrypting the database query. The encrypted match result is sent to the client, and the client decrypts the encrypted match result to obtain a set of block identifiers representing blocks of records in the database that match the database query. The client obtains a block of encrypted records containing match results using only the set of block identifiers. The match results are decrypted by the client using a key obtained from the server. The unencrypted match results to the database query are then output.

18 Claims, 9 Drawing Sheets

(56) References Cited

U.S. PATENT DOCUMENTS

2013/0173917 A1* 7/2013 Clifton ............... G06F 21/6227
                                                    713/167
2013/0227273 A1* 8/2013 Di Crescenzo ....... H04L 63/062
                                                    713/151

OTHER PUBLICATIONS

Giuseppe Ateniese and Gene Tsudik Emiliano De Cristofaro. (if) size matters: Size-hiding private set intersection. In Public Key Cryptography 2011, pp. 156-173, 2011.

Yonatan Aumann and Yehuda Lindell. Security against covert adversaries: Efficient protocols for realistic adversaries. Journal of Cryptology, 23 (2): pp. 281-343, 2010.

Joshua Baron, Karim El Defrawy, Kirill Minkovich, Rafail Ostrovsky, and Eric Tressler, 5pm: Secure pattern matching. In Security and Cryptography for Networks, pp. 222-240. Springer, 2012.

Joshua Baron, Karim El Defrawy, Kirill Minkovich, Retail Ostrovsky, and Eric Tressler. 5pm: Secure pattern matching, Special issue from Security and Cryptography in Networks (SCN), Journal of Computer Security 21 (2013), pp. 601-625.

David Cash, Stanislaw Jarecki, Jarecki Attie, Hugo Jarecki, Marcel-Cătălin A Roşu, Michael A Steiner, Michael. Highly-Scalable Searchable Symmetric Encryption with Support for Boolean Queries, CRYPTO 2013, Part I, LNCS 8042, pp. 353-373.

Emiliano De Cristotaro and Gene Tsudik. Practical private set intersection protocols with linear complexity. In Financial Cryptography and Data Security, pp. 143-159. Springer, 2010.

Rosario Gennaro, Carmit Hazay, and Jeffrey S Sorensen. Text search protocols with simulation based security. In Public Key Cryptography-PKC 2010, pp. 332-350. Springer, 2010.

S Dov Gordon, Jonathan Katz, Vladimir Kolesnikov, Fernando Krell, Tat Malkin, Mariana Raykova, and Yevgeniy Vahiis. Secure two-party computation in sublinear (amortized) time. In Proceedings of the 2012 ACM conference on Computer and communications security, pp. 513-524 ACM, 2012.

Lalana. Kagal. Policy compliance of queries for private information retrieval. Technical report, DTIC Document. 2010, pp. 1-46.

Yehuda Lindell, Fast cut-and-choose based protocols for malicious and covert adversaries. IACR Cryptology ePrint Archive, 2013: 79, 2013, pp. 0-23.

Vasilis Pappas, Mariana Raykava, Binh Vo, Steven M Bellovin, and Tail Malkin. Private search in the real world. In Proceedings of the 27th Annual Computer Security Applications Conference, pp. 83-92. ACM, 2011.

Juan Ramón Troncoso-Pastoriza, Stefan Katzenbeisser, and Mehmet Celik, Privacy preserving error resilient DNA searching through oblivious automata. In Proceedings of the 14th ACM conference on Computer and communications security, pp. 519-528. ACM, 2007.

* cited by examiner

STAGS: SECURE, TUNABLE, AND ACCOUNTABLE GENERIC SEARCH IN DATABASES

CROSS-REFERENCE TO RELATED APPLICATIONS

This is a is a Non-Provisional patent application of U.S. Provisional Patent Application No. 62/194,077, filed on Jul. 17, 2015, entitled, "STAGS: Secure, Tunable, and Accountable Generic Search in Databases."

BACKGROUND OF INVENTION

(1) Field of Invention

The present invention relates to a system for database searching and, more particularly, to a system for database searching that is secure, tunable, and accountable.

(2) Description of Related Art

The search for crucial technology that facilitates secure, privacy-preserving data sharing between national and international intelligence agencies has given rise to the Intelligence Advanced Research Projects Activity (IARPA) Automatic Privacy Protection (APP) and Security and Privacy Assurance Research (SPAR) programs (see the List of Incorporated Literature References, Literature Reference Nos. 1, 2, 6, 9, and 12).

Existing published systems resulting from these programs (see, for examples, Literature Reference Nos. 2, 6, 9, and 12) mainly support parties who behave according to the protocol, securing against the so-called honest-but-curious (HBC) or semi-honest adversary model, where, by assumption, parties are not able to deviate arbitrarily from the protocol.

Furthermore, resulting protocols and systems from those programs, such as described in Literature Reference No. 6, only support exact matching, also called keyword search, or limited range queries. Finally, some of the protocols and systems resulting from these programs rely on additional trusted parties (see, for example, Literature Reference No. 12).

Thus, a continuing need exists for a system which is secure against the covert adversary model, enables more expressive forms of querying via pattern matching, and assumes no trusted third parties.

SUMMARY OF THE INVENTION

The present invention relates to system for database searching and, more particularly, to a system for database searching that is secure, tunable, and accountable. The system comprises a client-server architecture which allows a client to securely search a database, having a plurality of records, possessed by a server. The client and the server each comprise one or more processors and a non-transitory computer-readable medium having executable instructions encoded thereon such that when executed, the one or more processors of the client and the server perform multiple operations. A database query is generated by the client, and the database query is transmitted from the client to the server. The database query is processed by the server using a privacy-preserving search protocol. The server then produces an encrypted match result without decrypting the database query. The encrypted match result is sent to the client. The client decrypts the encrypted match result to obtain a set of block identifiers representing blocks of records in the database that match the database query. A block of encrypted records containing match results is obtained by the client using only the set of block identifiers. The client decrypts the match results using at least one key obtained from the server, resulting in unencrypted match results. Finally, the unencrypted match results to the database query are output. The client-server architecture enforces that any database queries must adhere to a privacy-preserving query policy to ensure secure, privacy-preserving searches of sensitive data.

In another aspect, a query policy is provided by the server, and the query policy is used by the client to construct an encrypted database query such that the server can verify that the encrypted database query adheres to the query policy without having to decrypt the encrypted database query.

In another aspect, the system executes an oblivious transfer protocol between the client and the server to allow the client to obtain the at least one key from the server without revealing to the server the record which the at least one key decrypts.

In another aspect, the database query further comprises an unencrypted portion, wherein the unencrypted portion is used by the server to limit a range of the plurality of records to be processed to a smaller number of records.

In another aspect, the server identifies one or more blocks of records in the database that may contain a match to the database query. The block identifiers representing the one or more blocks of records are encrypted and sent to the client. The client obtains specific record identifiers for records in the one or more blocks of records that match the database query.

In another aspect, the client only learns the match results to the database query while learning nothing else about the database, and wherein the server does not learn any information about the database query.

In another aspect, the system uses a set of tunable parameters to trade off security and privacy constraints with efficiency of the client-server architecture.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
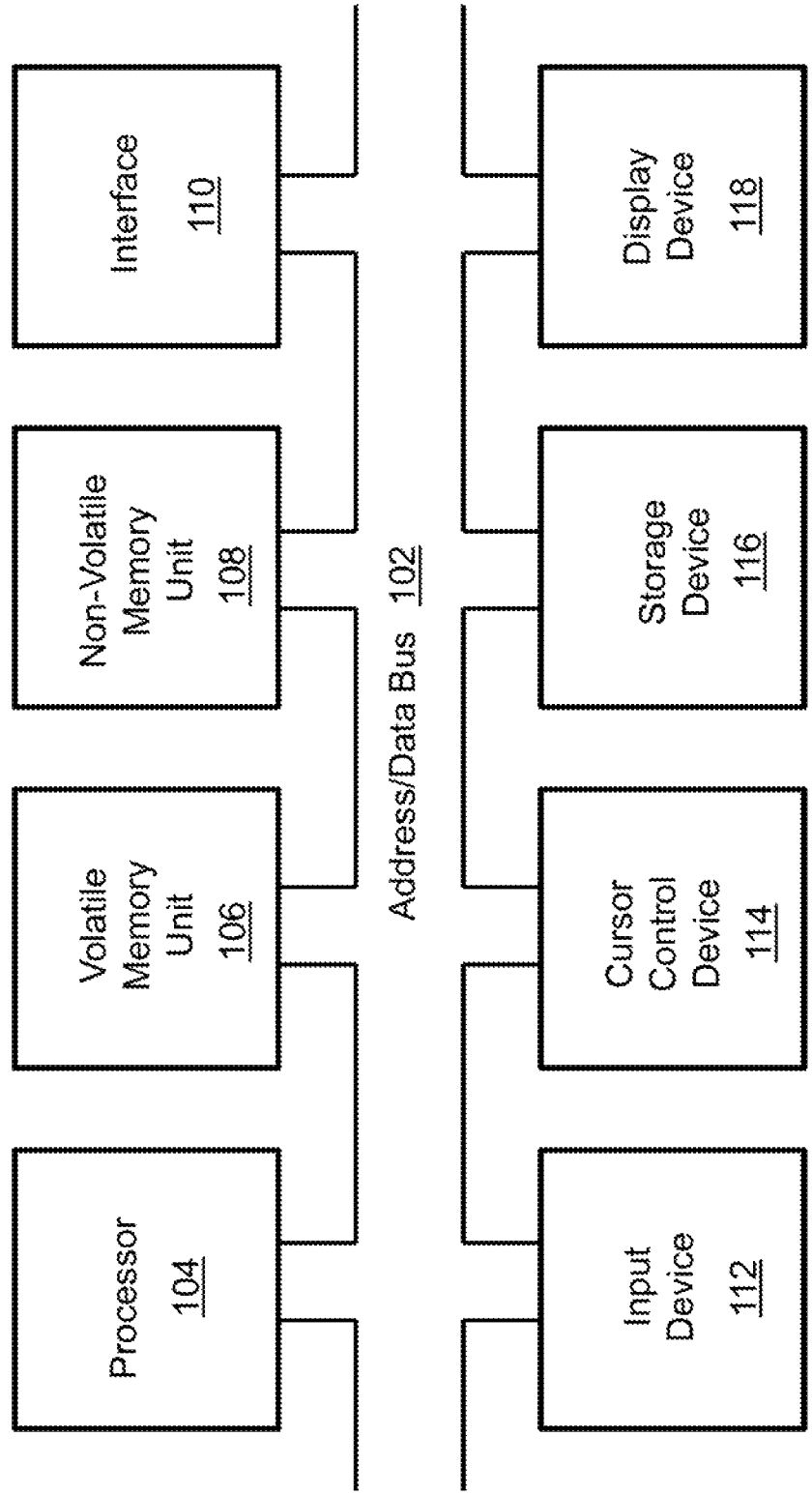
FIG. 1 is a block diagram depicting the components of a system for database searching according to embodiments of the present disclosure.

The present invention relates to a system for database searching and, more particularly, to a system for database searching that is secure, tunable, and accountable. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited literature references used in the description is provided. Next, a description of various principal aspects of the present invention is provided. Finally, specific details of the present invention are provided to give an understanding of the specific aspects.

(1) List of Incorporated Cited Literature References

The following references are cited and incorporated throughout this application. For clarity and convenience, the references are listed herein as a central resource for the reader. The following references are hereby incorporated by reference as though fully included herein. The references are cited in the application by referring to the corresponding literature reference number, as follows:

1. IARPA SPAR BAA Appendix E: Automatic Privacy Protection (APP) Program Results.
2. Giuseppe Ateniese and Gene Tsudik Emiliano De Cristofaro. (if) size matters: Size-hiding private set intersection. In Public Key Cryptography 2011, pages 156-173, 2011.
3. Yonatan Aumann and Yehuda Lindell. Security against covert adversaries: Efficient protocols for realistic adversaries. Journal of Cryptology, 23 (2): 281-343, 2010.
4. Joshua Baron, Karim El Defrawy, Kirill Minkovich, Rafail Ostrovsky, and Eric Tressler. 5 pm: Secure pattern matching. In Security and Cryptography for Networks, pages 222-240. Springer, 2012.
5. Joshua Baron, Karim El Defrawy, Kirill Minkovich, Rafail Ostrovsky, and Eric Tressler. 5 pm: Secure pattern matching. Journal of Computer Security, Special issue from Security and Cryptography in Networks (SCN) 2012, 2013.
6. David Cash, Stanislaw Jarecki, Jarecki Jutla, Hugo Jarecki, Marcel-Cătălin A Roşu, Michael A Steiner, Michael. Highly-Scalable Searchable Symmetric Encryption with Support for Boolean Queries, Crypto 2013.
7. Emiliano De Cristofaro and Gene Tsudik. Practical private set intersection protocols with linear complexity. In Financial Cryptography and Data Security, pages 143-159. Springer, 2010.
8. Rosario Gennaro, Carmit Hazay, and Jeffrey S Sorensen. Text search protocols with simulation based security. In Public Key Cryptography-PKC 2010, pages 332-350. Springer, 2010.
9. S Dov Gordon, Jonathan Katz, Vladimir Kolesnikov, Fernando Krell, Tal Malkin, Mariana Raykova, and Yevgeniy Vahlis. Secure two-party computation in sublinear (amortized) time. In Proceedings of the 2012 ACM conference on Computer and communications security, pages 513-524. ACM, 2012.
10. Lalana Kagal. Policy compliance of queries for private information retrieval. Technical report, DTIC Document, 2010.
11. Yehuda Lindell. Fast cut-and-choose based protocols for malicious and covert adversaries. IACR Cryptology ePrint Archive, 2013: 79, 2013.
12. Vasilis Pappas, Mariana Raykova, Binh Vo, Steven M Bellovin, and Tal Malkin. Private search in the real world. In Proceedings of the 27th Annual Computer Security Applications Conference, pages 83-92. ACM, 2011.
13. Juan Ramón Troncoso-Pastoriza, Stefan Katzenbeisser, and Mehmet Celik. Privacy preserving error resilient DNA searching through oblivious automata. In Proceedings of the 14th ACM conference on Computer and communications security, pages 519-528. ACM, 2007.

(2) Principal Aspects

Various embodiments of the invention include three "principal" aspects. The first is a system for database searching. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
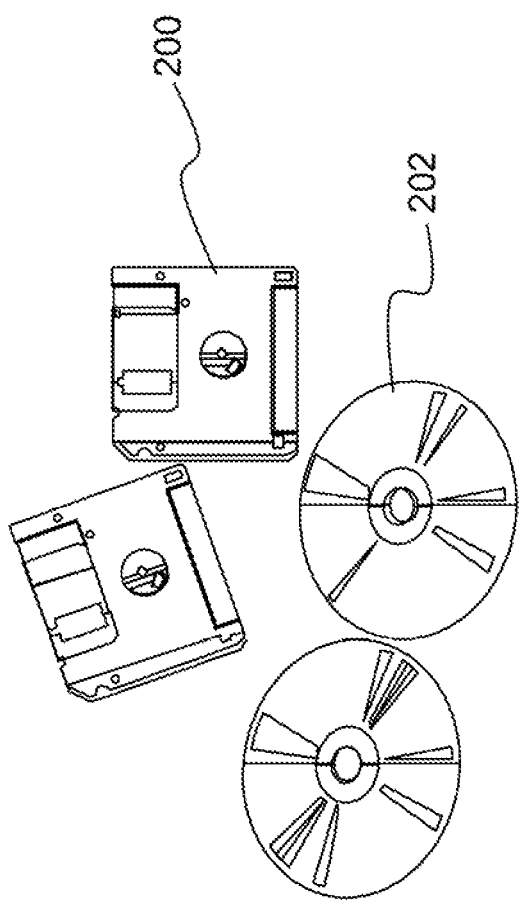
FIG. 2 is an illustration of a computer program product according to embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of the Invention

Described is a system to ensure that an encrypted query formed by a database client can be used to find matching database records without ever revealing the details of such a query. In addition, to provide more flexibility and enable fine-grained control, the system according to embodiments of the present disclosure, hereinafter referred to as secure, tunable, and accountable generic search (STAGS), enables a client to tune the performance of a query, making trade-offs between search performance and the potential for information leakage using three options.

The first option is to divide a query into two portions: an encrypted portion to be protected from the server, and an unencrypted portion to narrow the potential records that could match a query. This can significantly reduce the total number of records that have to be processed by the server. The second option is to alter the protocol. For example, switching between the honest-but-curious (HBC) adversary model and the tunable covert adversary model enables a client to obtain stronger security on their query at the cost of slower response time. A third option is to tune the cheat detection probability if the covert adversary model is used. Each of these options will be described in further detail below.

Figure 3:
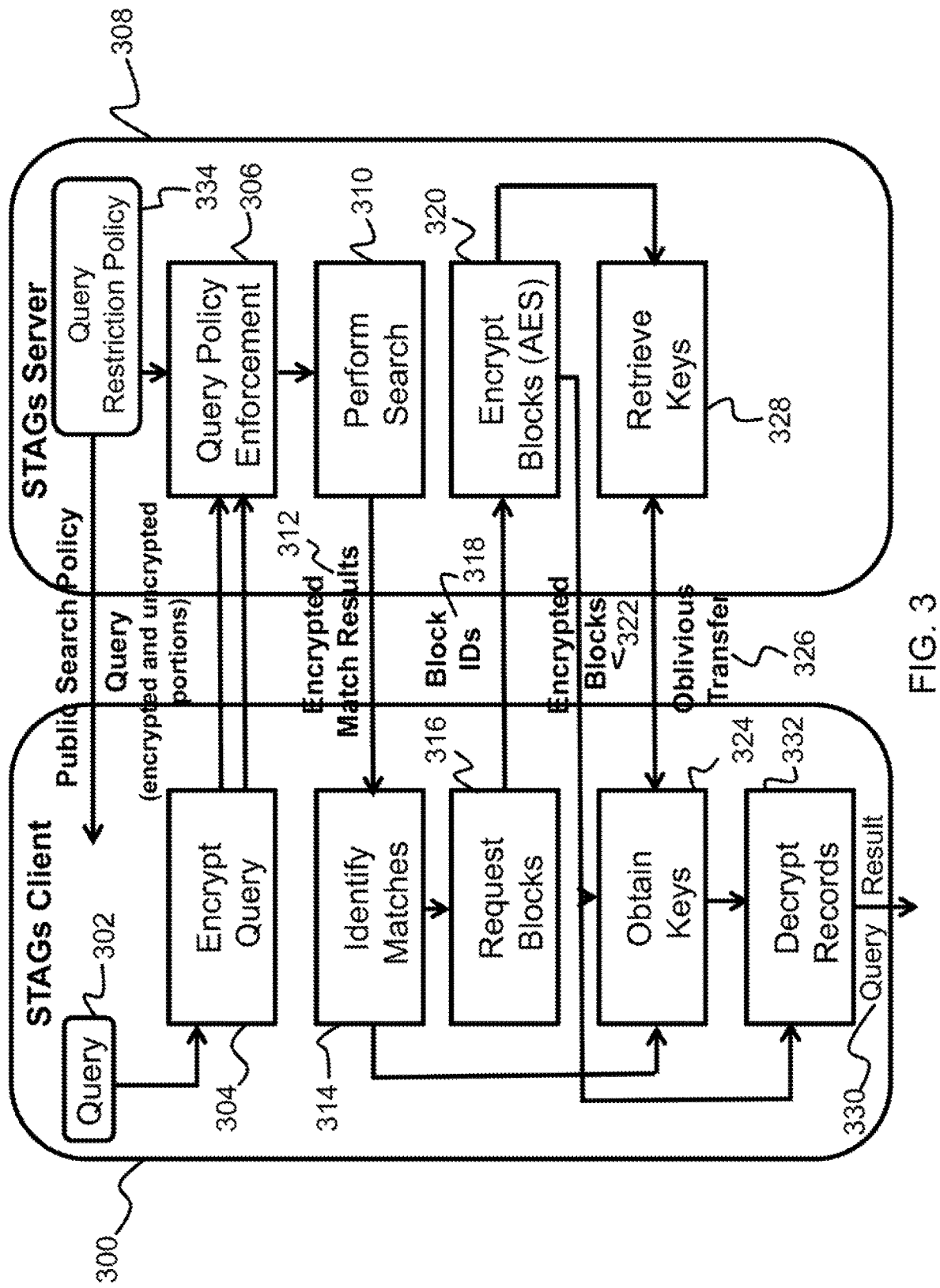
FIG. 3 is an illustration of the operation and secure search capabilities of the secure, tunable, and accountable generic search (STAGS) system according to embodiments of the present disclosure.

FIG. 3 depicts an overview of the operation and secure search capabilities of the STAGS system according to some embodiments of the present disclosure. The intention is to make the operation similar to that of a standard database interaction. First, a user, or a client/application (STAGS client 300) on behalf of the user, composes a standard database query 302, called the main query portion. In addition, the user may construct a narrowing portion of the query 302, such as a date range or regional constraint, which can reduce the number of records searched without revealing any sensitive details about the main query.

The main portion of a query 302 is then formatted and encrypted, resulting in an encrypted query 304, and sent to a query policy enforcement module 306 of a server 308. On the server 308 side, records are selected according to the narrowing portion of the query, and these are processed (i.e., perform search module 310) securely against the main query 302. For further processing efficiency, these remaining records may be subdivided into blocks. The number of records in a block can also be controlled, since blocks must be large enough to obscure what is searched. For each block being searched, the server 308 returns encrypted match results 312 to the client 300. By decrypting this result, the client 300 can identify matches 314 by learning which records in a block contained a match, but not the actual records.

To obtain the matching records, the client 300 first requests the blocks 316 with block IDs 318 that contain matching records. The server 308 encrypts the blocks 320, then provides symmetrically encrypted versions of these blocks (i.e., encrypted blocks 322) to the client 300 (e.g., using Advanced Encryption Standard (AES) encryption). The client 300 then interacts with the server 308 to obliviously obtain the keys 324 to the matching records. This is performed using an Oblivious Transfer (OT) protocol 326, which allows the client 300 to retrieve the key 328 to an encrypted record without having to reveal to the server 308 the specific record for which the key applies. The client 300 then obtains the unencrypted result of the query 330 by decrypting the matching records (i.e., decrypt records 332) using the obtained keys 324.

(3.1) Design and Software Architecture of STAGS

The general setting envisioned for STAGS' operation is that of a server 308 possessing a large database and a client 300 interested in securely and privately querying, searching and retrieving matching records without revealing which ones they are. Security and privacy guarantees provided to the client 300 are the following: correctness, cheating and misbehavior detection, and privacy. Correctness means that the server 308 cannot utilize a different query 302 than the one supplied by the client 300. Cheating and misbehavior detection means that if a server 308 misbehaves (e.g., uses a different query 302 or matches against certain database records but sends others in the record retrieval phase), it will be detected by the client 300 with high probability. This detection probability is a tunable parameter, with corresponding performance overhead. Privacy means that the server 308 does not learn anything about the client's 300 query 302, other than what the client 300 intends the server 308 to learn (e.g., the client 300 can send certain portions of the query 302 in the clear to improve performance).

Security and privacy guarantees provided to the server 308 include correctness, cheating and misbehavior detection, and privacy. Correctness means that the client's 300 query 302, even if only consisting of encrypted portions, will only be matched against the database if it adheres to a server's 308 query restriction policy 334. Cheating and misbehavior detection means that if a client 300 misbehaves (e.g., requests records in the retrieval phase that are other than what matched its query 302 in the searching phase (i.e., perform search module 310), it will be detected by the server 308 with high probability. This detection probability is a tunable parameter, with corresponding performance overhead. Privacy means that the client 300 only learns records that match its query 302; no information about the server's 308 database is leaked to the client 300 beyond matching records.

The STAGS system requires the following cryptographic protocols and algorithms that address challenges:

(1) Secure Generic Search (SGS) protocol 402: To enable secure generic search, STAGS requires an efficient, secure, privacy-preserving cryptographic protocol that can handle expressive database queries 302 from a database of records 404. Expressiveness implies a wide range of search modes, including exact matching, approximate matching, range queries, matching with wildcards, and conjunctions of various query terms. Such features enable secure evaluation of a core fragment of database queries (e.g., SQL (structured query language) queries).

(2) Secure Query Policy Enforcement (SQPE) protocol 406: To ensure that the query 302 sent by the client 300 matches the query restriction policy 334 defined by the server 308, efficient cryptographic protocols are needed to securely check compliance of the client's 300 encrypted query 304 with the server's 308 query restrictions found in the query restriction policy 334.

(3) Secure and Private Retrieval of Records (SPRR) protocol 408: While the SGS protocol 402 and the SQPE protocol 406 enable a client 300 to obtain indices of records (i.e., block IDs 318) that match the client's 300 policy-complying query 302, the client 300 must be able to efficiently and securely retrieve only those corresponding records without the server 308 learning which records were obtained. This requires developing an efficient and secure protocol to obliviously transfer 326 records (i.e., keys) from the server 308 to the client 300.

(4) Tunable Performance Enhancements (TPE) protocol: In addition to the above challenges, additional performance optimization mechanisms can restrict expensive cryptographic operations to a small subset of database records, while minimizing information leaked to the client 300 and/or server 308. Such mechanisms may require offline (periodic) precomputation on the database to speed up online querying and record retrieval phases and protocols.

Figure 4:
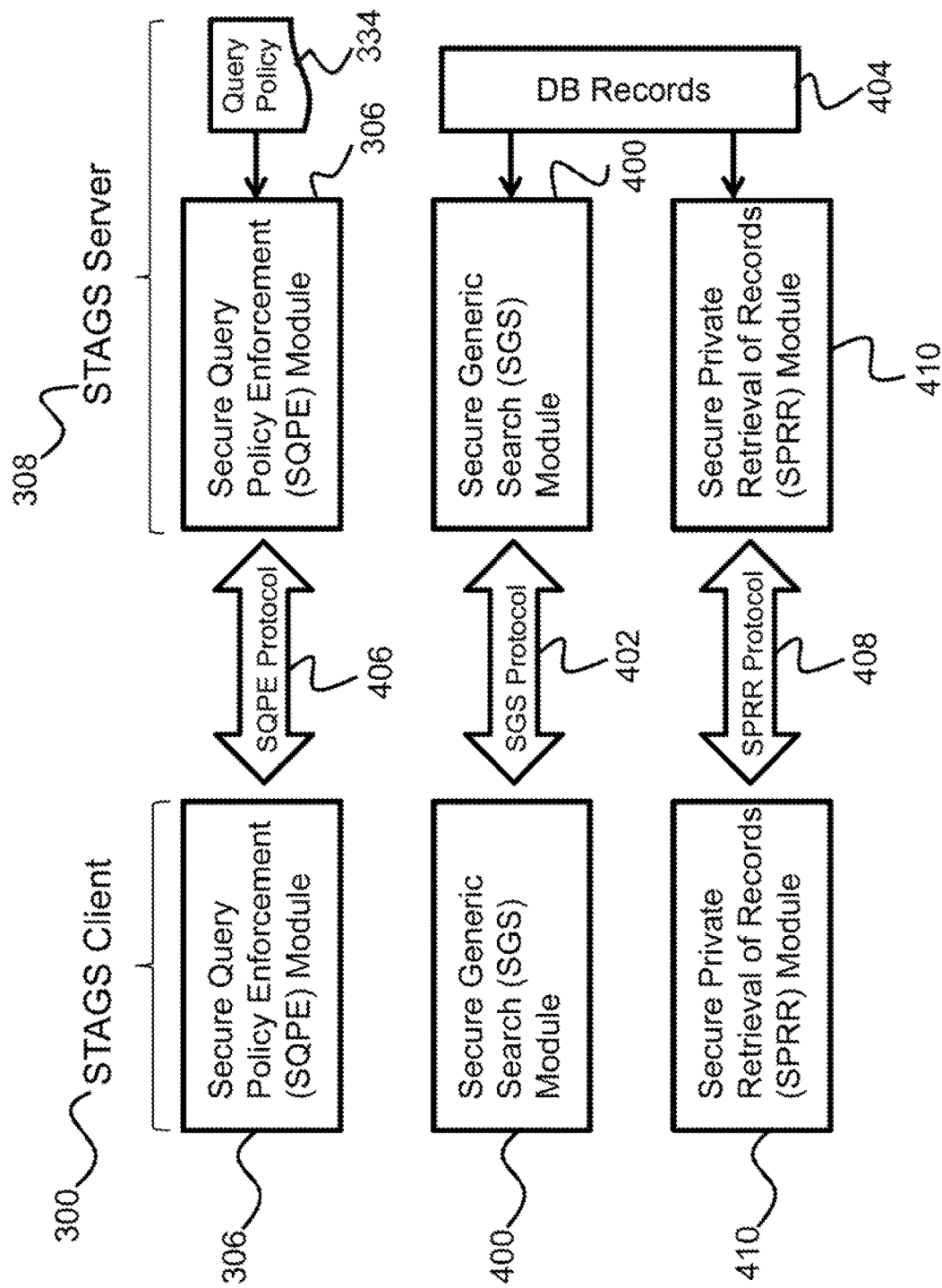
FIG. 4 is an illustration of the STAGS system enforcing query restriction policies with tunable performance trade-offs according to embodiments of the present disclosure.

FIG. 4 illustrates how the STAGS system enforces query restriction policies with tunable performance trade-offs and guarantees data protection. The architecture integrates software modules, SGS modules 400 (also referred to as the perform search module 310), SQPE modules 306 (also referred to as the query policy enforcement module, and SPRR modules 402, implementing the SGS protocol 404, the SQPE protocol 406, and the SPRR protocol 410, respectively, and utilizing the TPE protocol to provide a tunable, efficient, secure and privacy-preserving system that can be adapted to various use cases.

(3.2) Data Flow

The following outlines the overall data flow in STAGS operation according to the embodiments of the present disclosure. The operation starts with a user, or an application on the user's behalf denoted the STAGS client 300, having a database query 302 to be computed on a remote STAGS server 308. STAGS operation proceeds as follows. The query 302 is formatted and encrypted on the user's client 300 and then transmitted to the remote server 308. Note that the user may selectively expose portions of the query 302. Such unencrypted portions can be used to improve search efficiency without revealing any details of the encrypted portion of the query.

Upon receipt of a client's 300 query 302, the SQPE protocol 406 (performed in the query policy enforcement module 306, also referred to as the SQPE module 306) is executed between client 300 and server 308 using the client's 300 and the server's 308 query restriction policy 334. The SQPE protocol 406 verifies that the client's 300 query 302 complies with the server's 308 query restriction policy 334. At the end of its execution, the SQPE protocol 406 outputs ACCEPT or REJECT to the server 308.

If the output of the SQPE protocol 406 is ACCEPT, then the server 308 selects sets of records to be searched. If an unencrypted query portion is supplied by the client 300, it is used to narrow the range of records and associated fields that need to be examined on the server 308 side, thereby reducing required communication and computation. Records are organized into blocks consisting of a fixed (tunable) number of records. Blocks are searched securely using the SGS protocol 404 as part of the perform search module 310 (or SGS module 400), which takes an encrypted query 304 as input and produces an encrypted matching result 312 without ever revealing to the server 308 anything about the encrypted portion of the query 302 or whether a successful match has occurred or not. For each block, the corresponding set of encrypted match results 312 is then returned to the client 300 along with the block identifier (block IDs 318).

Once the client 300 receives the encrypted match results 312, it decrypts them and determines which records in the block match the query 300 (i.e., record indices). The client 300 sends a request to the server for the blocks that contain matches by providing the associated block identifiers (block IDs 318).

The server 308 responds to this request by performing symmetric encryption (e.g., using AES encryption) to encrypt blocks 320 on corresponding records in requested blocks, using a unique encryption key for each record. These encrypted records are then sent to the client 300. Accordingly, the server 308 knows only which blocks contained a match to the query 302 without knowing which specific records matched. The number of blocks and number of records in each block is a tunable parameter.

Since the client 300 knows which specific records to decrypt, it now executes an oblivious transfer protocol 326 with the server 308 to obtain the keys 324 for the query-matching records. The oblivious transfer protocol 326 allows the client 300 to obtain specific keys without ever having to reveal which keys it requested. Again, this leaves the server 308 without any knowledge of the specific query 302 or which specific records were recovered.

(3.3) Adversary Models

Adversaries in the real world can, and do, behave in unexpected ways. Correctly modeling adversaries has a significant impact on the level of security; assuming too much about an adversary's strategy can result in security vulnerabilities, since adversaries do not adhere to any prescribed rules. Below is an (informal) overview of the main adversary models typically considered in the security and cryptography research community and, thus, in the system and protocol design of STAGS. To prove security of a cryptographic protocol, one has to clearly define the adversary model being considered and demonstrate mathematically that the designed protocol withstands attacks launched by it.

In the Honest-But-Curious (HBC) model, sometimes denoted as the semi-honest model, adversaries follow the protocol specification but may try to deduce additional information from messages they receive. Such an adversary can only perform passive attacks. Unfortunately, in many cases, this level of security is not sufficient. In reality, once a system is compromised, code and programs on it can be easily modified. All protocols secure against stronger adversary models are typically secure against HBC adversaries.

In the malicious adversary model, of more concern are cases where adversaries may deviate arbitrarily from the protocol specification, modeling the setting of a full system controlled by an adversary. The malicious adversary model describes such adversarial behavior; unfortunately, it is often hard to obtain highly efficient protocols that are secure in that model.

Other intermediate models of adversarial behavior have been proposed because security in the HBC model is frequently inadequate in practice, and protocols secure in the malicious model are typically inefficient. Intermediate models can often withstand adversaries stronger than the HBC model and weaker than (or provide a relaxation of) the malicious one.

The covert adversary model is one of such intermediate, tunable adversary models. Informally, a covert adversary may launch any kind of passive or active attacks, or a combination thereof, and thus may be able to cheat (e.g., try to learn the other party's private input or affect result of the computation by arbitrarily deviating from the prescribed protocol). However, when a covert adversary cheats, there is a guarantee that she/he will be caught with a probability of at least ρ, where ρ is called the deterrence probability. The formal definition of covert adversaries is fully specified in Literature Reference No. 3. The covert model is highly suitable in settings where parties incur penalties if caught cheating. For instance, if a party is barred from all future interaction if ever caught cheating, then the covert model might be ideal, particularly in settings of repeated interactions. Note that when ρ is equal to 1, the covert model captures malicious adversaries.

The remaining description of the present invention focuses on the covert adversary model, as it provides a tunable tradeoff between security, privacy, and performance overhead and is well suited for settings where large governmental and international organizations share data.

(3.4) STAGS Modules and Underlying Cryptographic Protocols

The following is a description of the functionality of each of the modules in the STAGS system and software architecture illustrated FIG. 4. Each of the modules has both a client 300 side and a server 308 side.

(3.4.1) Secure Generic Search (SGS) Module 400 and Protocols 402

The SGS module 400 implements a secure and privacy-preserving protocol that can handle expressive database queries. The SGS protocol 402 should be designed to be able to express a wide range of search capabilities, such as exact matching, approximate matching, range queries, matching with wildcards, and conjunctions of various terms. This allows one to construct a large class of typical database queries (e.g., SQL-based queries), and evaluate them securely. The SGS module 400 is depicted as the perform search module 310 in FIG. 3

Figure 5:
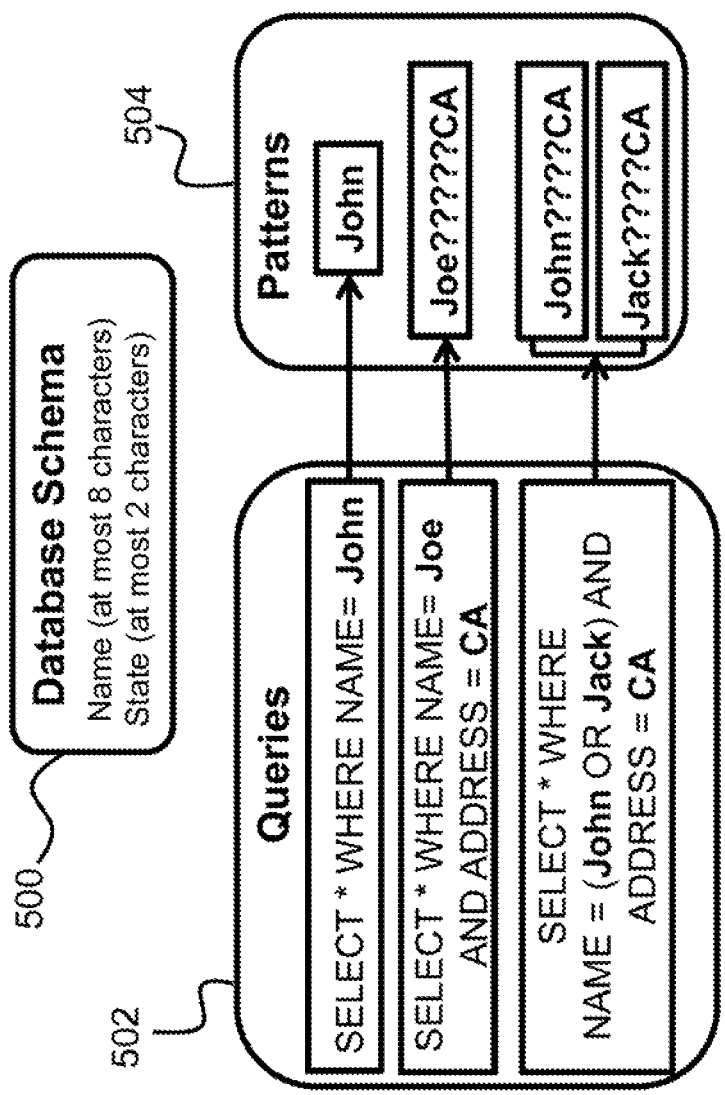
FIG. 5 is an illustration of a simple database schema with two attributes, corresponding queries, and their conversion patterns to be matched according to embodiments of the present disclosure.

The SGS protocol 402 in the SGS module 400 achieves the required secure and privacy-preserving generic search functionality by converting the client's 300 queries 302 to patterns with wildcards and/or approximate matches. FIG. 5 shows a simple example of a database schema 500 with two attributes (Name and State), corresponding queries 502, and their conversion to patterns 504 to be matched.

The SGS module 400 can be implemented via a secure pattern matching protocol secure in the covert security model. One way to obtain such a protocol is via the efficient, generic covert-secure computation techniques of Literature Reference No 7, which can be tuned to handle varying detection probabilities. Another approach could be to adapt the protocol described in U.S. Non-Provisional application Ser. No. 13/749,683 (also published in Literature References No. 5 and 6) to be secure in the covert model.

(3.4.2) Secure Query Policy Enforcement (SQPE) Module 306 and Protocols 406

The SQPE module 306 enables the STAGS server 308 to securely check if a client's 300 encrypted query 304 complies with restrictions on allowable queries 302 defined by a server 308 for that client 300, which is denoted as a query restriction policy 334 (or query policy for short). The SQPE module 402 can be employed when the query restriction policy 334 is either known or unknown to the client 300. Further, the module can be employed when all or part of the client's 300 query 302 is encrypted.

The SQPE module 306 enables the query restriction policy 334 to encompass several types of restrictions:

1. Field Restriction: This type of restriction is a total restriction on a table attribute (or field). An example of this is "The user may not retrieve the zip code attribute from a record."

2. Filter Restriction: This type of restriction prevents querying using an attribute or a field. An example of this type is "The user may not query based on Minor status."

3. Conditional Filter: This broadens the filter restriction by including a conditional statement. An example of this type is "The user may not query based on state='Oregon' AND retrieve HomePhone."

The restrictions above enable defining different policies for different clients 300, each with their own types and values of restrictions. Once the policy is defined by the server 308 and a query 302 is sent by the client 300, both engage in an SQPE protocol 406 to perform the policy checking task.

The core functionality of the SQPE module 406 is to securely and privately compute the query restriction policy 334 on an encrypted query 304 via a finite state machine (FSM) expressing that policy. In particular, the FSM is constructed by the server 308, and the input query 302 is provided by the client 300. The server 308 uses the set of query restrictions defined above to construct an FSM that will accept the query 302 as input and output ACCEPT if and only if the query 302 does not violate one of the restrictions. Note that the only filter that is difficult to compute on encrypted queries 304 is the conditional filter. Field and filter restrictions can be accomplished via masks on the encrypted inputs (i.e., encrypted queries 304) and output to the SGS module 400 (or perform search module 310).

Figure 6A:
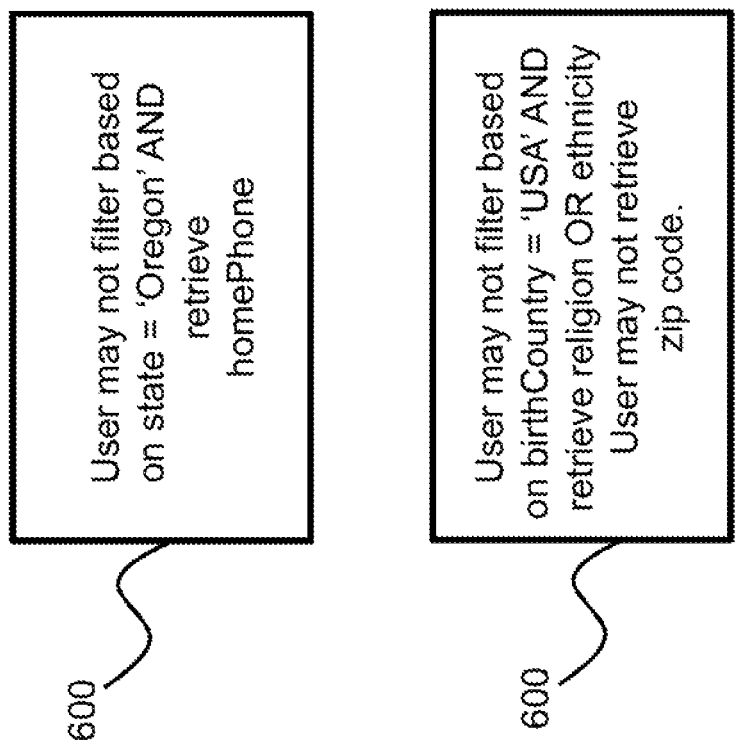
FIG. 6A is an illustration of policy statement building blocks according to embodiments of the present disclosure.
Figure 6B:
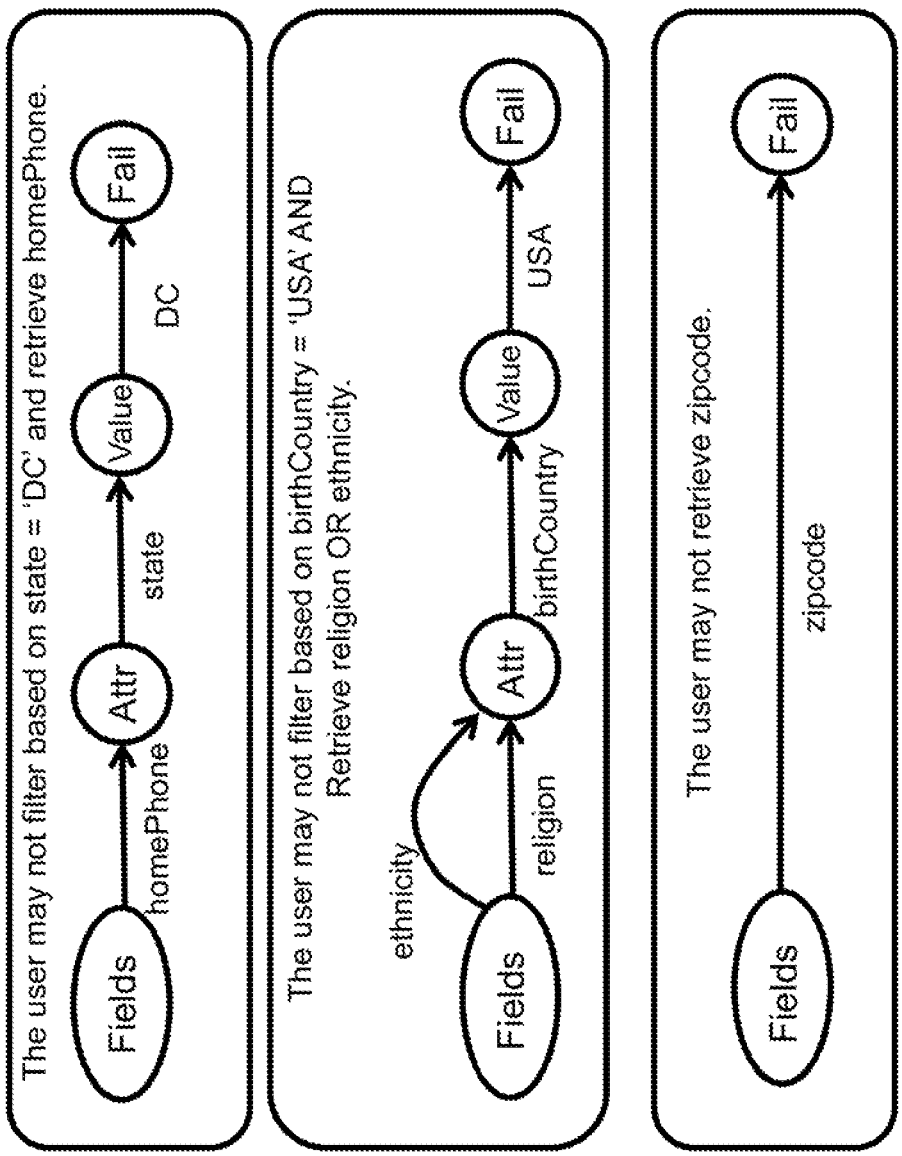
FIG. 6B is an illustration of finite state machines (FSMs) for each query restriction according to embodiments of the present disclosure.
Figure 6C:
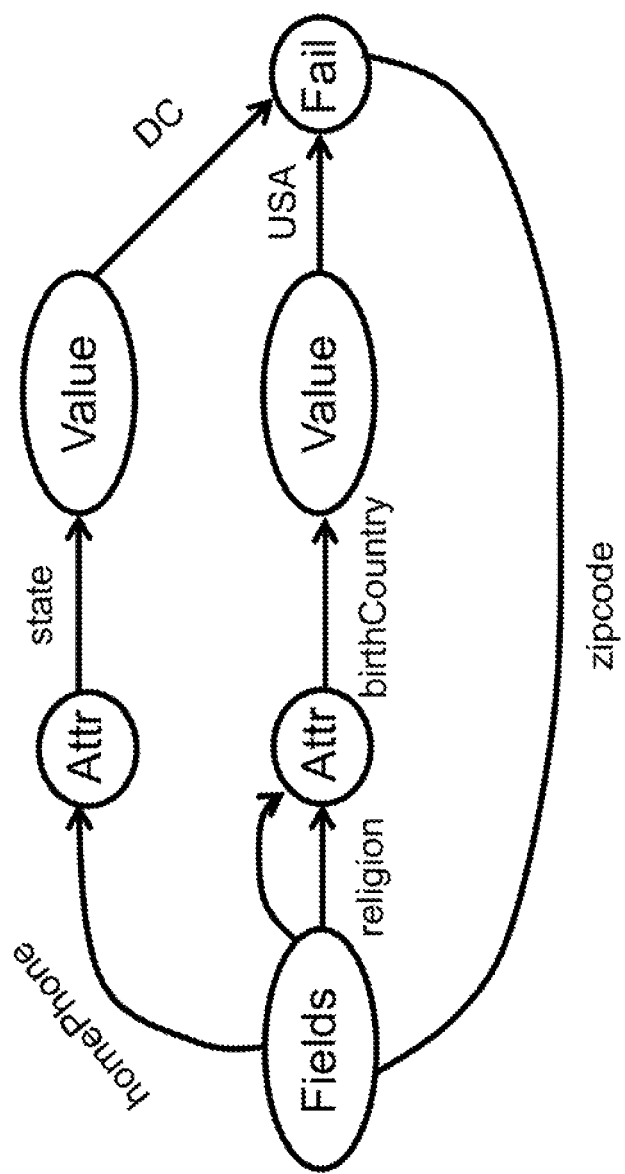
FIG. 6C is an illustration of the combined FSM according to embodiments of the present disclosure.

FIG. 6A contains an example of policy statement building blocks, also referred to as a set of query restrictions 600. Since queries 302 are of the form "SELECT [fields] from [records] WHERE [attribute]=[value]", a simple FSM can be built to verify that the query subparts do not violate a specific restriction. A set of query restrictions 600 are shown in FIG. 6A and the FSMs for each query restriction are depicted in FIG. 6B. FSMs can be combined together into an FSM that can check multiple rules to enforce the complex restrictions, as illustrated in FIG. 6C.

There are protocols in the literature that can privately compute an FSM utilizing homomorphic encryption, both in the HBC model and in the malicious model. In Literature Reference No. 13, the authors present a study of (so-called) oblivious automata evaluation in the HBC model; Literature Reference No. 8 extends this work to the malicious model. Their technique relies on homomorphic encryption schemes and 1-out-of-m oblivious transfer ( ) protocols as cryptographic building blocks. The core of the secure FSM functionality is to envision the FSM transition function, Δ, as a |Σ| by |Q| lookup table where Q is the set of states (i.e., |Q| is the total number of possible states). In particular, the (i,j) entry of Δ contains what state to move to when the entry at state $q_i$ is j∈Σ.

(3.4.3) Secure Private Retrieval of Records (SPRR) Module 410 and Protocols 408

The SPRR module 410 implements a secure, privacy-preserving protocol that can retrieve records that are indicated by the output of the SGS module 400. In particular, the SGS module 400 will be implemented on a sequence of blocks of records that the SGS module 400 output has indicated contain records matching the client's 300 query 302. The client 300 will only learn records that match the query 302, while the server 308 will only learn the blocks containing matches, and otherwise will not receive any information about which queries 302 within the block were retrieved.

The SPRR module's 410 operation involves two phases. In the first phase, the client 300 obtains all encrypted blocks 320 of records that contain records that could match the client's 300 query 302. Each record in the block is encrypted using symmetric-key encryption (e.g., AES), and employing a unique key for each record.

In the second phase, the client 300 obtains the keys 324 corresponding to the records that match its query 302 such that the server 308 does not learn which keys are obtained. This allows the client 300 to obtain the records without the server 308 learning which records were obtained.

In the first phase of the SPRR module 410, the client 300 informs the server 308 which blocks examined in the SGS module 400 will be required for oblivious record retrieval. One approach to achieve this is to let the server 308 encrypt all blocks that were considered in the SGS module 400 using AES, with a unique key for each record; otherwise, cryptographic "proof" might be needed from the client 300 demonstrating that the blocks being sent correspond with the SGS module 400 output results.

In the second phase of the SPRR module 410, the client 300 will execute an m-out-of-n oblivious transfer (OT) protocol to obtain the keys 324 for the records that match the query 302. Such a protocol allows the client 300 to obtain up to m keys from amongst n different keys without the server 308 learning which keys are obtained, while the client 300 only learns the m keys and nothing else. One technical challenge is how to ensure that the client 300 is asking only for the keys that correspond to SGS module 400 output matches. A solution to this challenge includes tying the key used to decrypt the record with the output of the SGS module 400 so that a client 300 must use the key output from the SGS module 400 as part of the decryption to obtain proper records. Another solution uses the so-called garbled circuit technique. If both the SGS module 400 and the SPRR module 410 are designed using garbled circuits, the protocol itself can be designed to only output allowed keys, instead of the indices needed to request the keys.

(3.4.4) Tunable Performance Enhancements (TPE)

Figure 7:
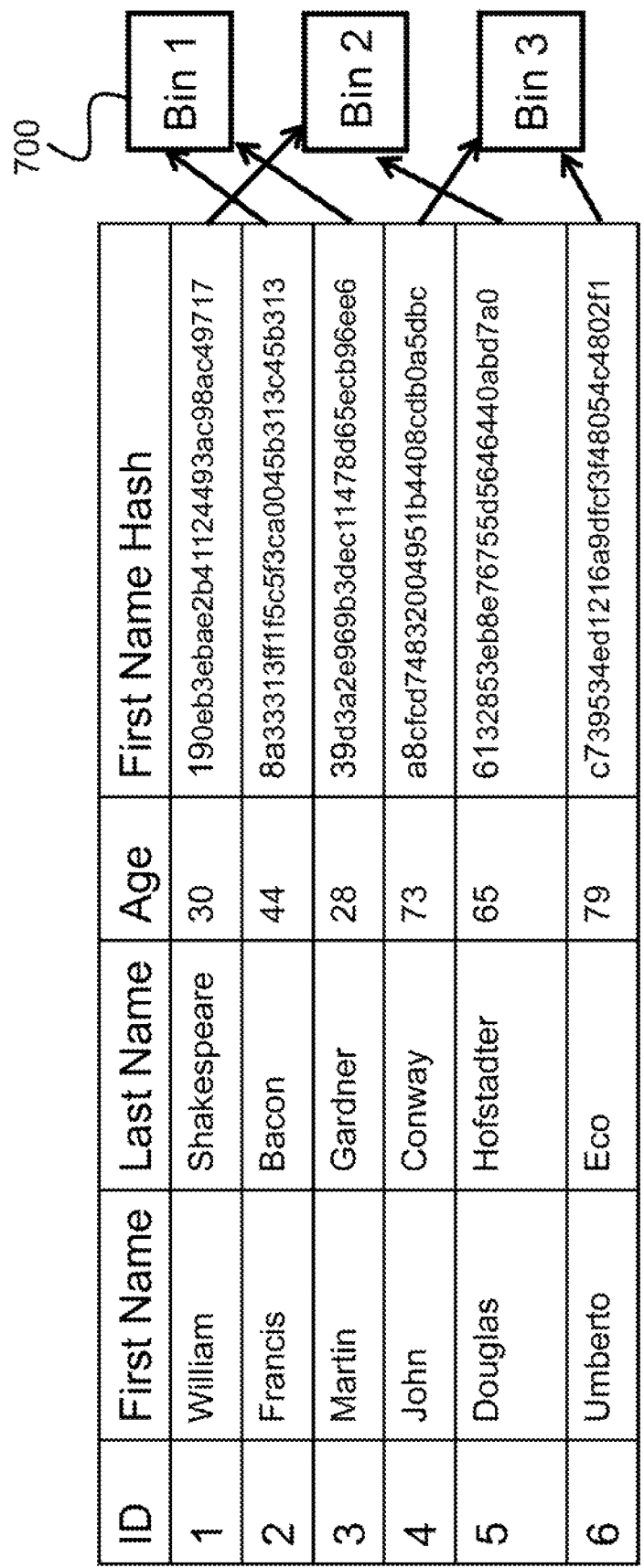
FIG. 7 is an illustration of an example of data segmentation to improve the overall performance of the STAGS system according to embodiments of the present disclosure.

The following describes a form of precomputation to enhance the efficiency of STAGS operation. One can hash the database into bins, and then apply the hash functions to attributes of the database in such a way that similar items (according to some predetermined setting) hash into the same bin. The goal is to use the known database schema 500 and segment the fields that are likely to be commonly queried into N equal-size bins (blank records will pad smaller bins to ensure uniformity). An example of data segmentation is illustrated in FIG. 7. Data segmentation will improve the overall performance of the STAGS system according to the embodiments of the present disclosure. After performing a database query 502, the client 300 will be able to independently determine the bins of interest (e.g., Bin 1 700). If the database has been segmented properly, the client 300 will only have to consider the bin (e.g., Bin 1 700) or bins that hold these records.

After the database is partitioned in this way, the client 300 retrieves all of the matching vectors (and not the corresponding records). Then the client 300 and the server perform m-out-on-n oblivious transfer (which is described in Literature Reference No. 7) to retrieve the indices of the matching vectors in the appropriate bin. These indices will indicate to the client 300 which matching vectors to decrypt and examine, thus reducing the total number of homomorphic decryptions that must be performed. In this way, oblivious transfer is only required on the indices, so the cost of this primitive will be minimal.

In summary, the present invention describes a database system that enables Secure, Tunable, and Accountable Generic Search, denoted as STAGS. The capabilities offered by STAGS are currently unavailable in state-of-the-art secure, privacy-preserving database systems. The STAGS system uses a set of unique, provably-secure cryptographic protocols that perform secure and efficient computation to facilitate privacy-preserving search and retrieval of information from databases that could (scale up to) consist of 100,000+ records and 10,000+ transactions per day on a single server. The STAGS system can also be scaled up to handle millions of records and 100,000+ transactions using multiple servers. In addition, the system allows the database owner to confidently grant access to specific entities (e.g., law enforcement and intelligence organizations), assured that both mutually mistrusting clients and servers are protected by a rich set of capabilities that ensure secure, privacy-preserving searches of text, image and biometric data using flexible query mechanisms with exact, approximate, substring, and wildcard matching as well as some range queries. These security and privacy guarantees facilitate detecting and flagging of malicious behavior, while ensuring minimal leakage of sensitive information—other than matching records—to querying parties. Dynamically tunable control "knobs" allow entities/users (e.g., law enforcement and government organizations) to adapt the STAGS system to various deployment settings that consider the entire spectrum of real-life adversarial behavior, such as passive and active attacks launched by insiders and/or outsiders. STAGS servers can individually tailor the system to each client to fit different use cases; clients can tune each query to the appropriate balance between security and privacy guarantees and performance.

Another important component of the STAGS system is a set of algorithms and protocols that provide the ability to restrict the attributes and values used for an encrypted database query, called "query restriction policy enforcement" (denoted as query policy enforcement). Query policy enforcement only permits queries that conform to a mutually agreed upon set of rules and restrictions between database server and each client. These restrictions clearly define a set of access restrictions for each client; the enforcement mechanism can handle various rules and restrictions by securely evaluating them against an encrypted query. Such a mechanism is critical for widespread acceptance of the technology, especially between mutually distrusting organizations. If desired, the query policy can also be kept private to the server and not revealed to clients.

The system described herein has multiple applications. For instance, a corporation can use the system to construct a secure and privacy-preserving database technology for the intelligence, defense, or law enforcement communities. For instance, an intelligence agency may wish to search databases that contain United States Person information, which they are legally not allowed access. However, the agency does not wish to reveal the query, either. Using the STAGS system described herein, the agency can send the encrypted query to the database holder. Using the query restriction enforcement module of the STAGS system, the database holder can verify that the encrypted query does not ask for U.S. Person information (or fits within a different query policy). Finally, using the STAGS system, the database holder can send the query response as well as relevant database entries without learning which entries were accessed.

Additionally, the present invention can be used to access vehicle information stored on an event data recorder (EDR)

without revealing queries to the EDR storage facility and without violating driver privacy. The system would enforce that queries must adhere to a privacy-preserving query policy (such as not revealing precise location data). The STAGS system can also be used to provide selective access to law enforcement agencies to customer databases.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for database searching, the system comprising:
   a client-server architecture which allows a client to securely search a database, having a plurality of records, possessed by a server;
   wherein the client and the server each comprise one or more processors and a non-transitory computer-readable medium having executable instructions encoded thereon such that when executed, the one or more processors of the client and the server perform the following operations:
   generating a database query by the client, wherein the database query is tunable such that the client tunes the database query to a balance between a security guarantee, a privacy guarantee, and a search performance, wherein the security and privacy guarantees comprise a correctness component, a cheating and misbehavior detection component, and a privacy component;
   converting the database query to a queryable pattern;
   transmitting the queryable pattern from the client to the server;
   processing the queryable pattern by the server using a privacy-preserving search protocol;
   producing, by the server, an encrypted match result for the queryable pattern without decrypting the database query;
   sending the encrypted match result to the client;
   decrypting, by the client, the encrypted match result to obtain a set of block identifiers representing blocks of records in the database that match the database query;
   obtaining, by the client, a block of encrypted records containing match results using only the set of block identifiers;
   executing an oblivious transfer protocol between the client and the server to allow the client to obtain at least one key from the server without revealing to the server the encrypted record which the at least one key decrypts;
   decrypting, by the client, the match results using the at least one key obtained from the server, resulting in unencrypted match results;
   outputting the unencrypted match results to the database query; and
   enforcing, by the client-server architecture, a query policy that only permits database queries that conform to a set of rules and restrictions mutually agreed upon between the server and the client to ensure secure, privacy-preserving searches of sensitive data.

2. The system as set forth in claim 1, wherein the query policy is provided by the server, and the query policy is used by the client to construct an encrypted database query such that the server verifies that the encrypted database query adheres to the query policy without having to decrypt the encrypted database query.

3. The system as set forth in claim 2, wherein the database query further comprises an unencrypted portion, wherein the unencrypted portion is used by the server to limit a range of the plurality of records to be processed to a smaller number of records.

4. The system as set forth in claim 3, wherein the one or more processors further perform operations of:
   identifying, by the server, one or more blocks of records in the database that may contain a match to the database query;
   wherein the block identifiers representing the one or more blocks of records are encrypted and sent to the client; and
   obtaining, by the client, specific record identifiers for records in the one or more blocks of records that match the database query.

5. The system as set forth in claim 4, wherein the client only learns the match results to the database query while learning nothing else about the database, and wherein the server does not learn any information about the database query.

6. The system as set forth in claim 1, wherein the correctness component ensures that the database query will only be matched against the database if the database query adheres to a server's query restriction policy, wherein the cheating and misbehavior detection component ensures that if a server or client sends or requests records other than what matched the database query, cheating and misbehavior will be detected according to a tunable probability, and wherein the privacy component ensures that the client only learns records that match its database query.

7. A computer-implemented method for database searching in a client-server architecture which allows a client to securely search a database, having a plurality of records, possessed by a server, comprising:
   an act of causing one or more processors of the client and the server to execute instructions stored on a non-transitory memory such that upon execution, the one or more processors perform operations of:
   generating a database query by the client, wherein the database query is tunable such that the client tunes the database query to a balance between a security guarantee, a privacy guarantee, and a search performance, wherein the security and privacy guarantees comprise a correctness component, a cheating and misbehavior detection component, and a privacy component;
   converting the database query to a queryable pattern;
   transmitting the queryable pattern from the client to the server;
   processing the queryable pattern by the server using a privacy-preserving search protocol;
   producing, by the server, an encrypted match result for the queryable pattern without decrypting the database query;

sending the encrypted match result to the client;

decrypting, by the client, the encrypted match result to obtain a set of block identifiers representing blocks of records in the database that match the database query;

obtaining, by the client, a block of encrypted records containing match results using only the set of block identifiers;

executing an oblivious transfer protocol between the client and the server to allow the client to obtain at least one key from the server without revealing to the server the encrypted record which the at least one key decrypts;

decrypting, by the client, the match results using the at least one key obtained from the server, resulting in unencrypted match results;

outputting the unencrypted match results to the database query; and enforcing, by the client-server architecture, a query policy that only permits database queries that conform to a set of rules and restrictions mutually agreed upon between the server and the client to ensure secure, privacy-preserving searches of sensitive data.

8. The method as set forth in claim 7, wherein the query policy is provided by the server, and the query policy is used by the client to construct an encrypted database query such that the server verifies that the encrypted database query adheres to the query policy without having to decrypt the encrypted database query.

9. The method as set forth in claim 8, wherein the database query further comprises an unencrypted portion, wherein the unencrypted portion is used by the server to limit a range of the plurality of records to be processed to a smaller number of records.

10. The method as set forth in claim 9, wherein the one or more processors further perform operations of:

identifying, by the server, one or more blocks of records in the database that may contain a match to the database query;

wherein the block identifiers representing the one or more blocks of records are encrypted and sent to the client; and obtaining, by the client, specific record identifiers for records in the one or more blocks of records that match the database query.

11. The method as set forth in claim 10, wherein the client only learns the match results to the database query while learning nothing else about the database, and wherein the server does not learn any information about the database query.

12. The method as set forth in claim 7, wherein the correctness component ensures that the database query will only be matched against the database if the database query adheres to a server's query restriction policy, wherein the cheating and misbehavior detection component ensures that if a server or client sends or requests records other than what matched the database query, cheating and misbehavior will be detected according to a tunable probability, and wherein the privacy component ensures that the client only learns records that match its database query.

13. A computer program product for database searching in a client-server architecture which allows a client to securely search a database, having a plurality of records, possessed by a server, the computer program product comprising computer-readable instructions stored on a non-transitory computer-readable medium that are executable by a computer having one or more processor for causing the processor to perform operations of:

generating a database query by the client, wherein the database query is tunable such that the client tunes the database query to a balance between a security guarantee, a privacy guarantee, and a search performance, wherein the security and privacy guarantees comprise a correctness component, a cheating and misbehavior detection component, and a privacy component;

converting the database query to a queryable pattern;

transmitting the queryable pattern from the client to the server;

processing the queryable pattern by the server using a privacy-preserving search protocol;

producing, by the server, an encrypted match result for the queryable pattern without decrypting the database query;

sending the encrypted match result to the client;

decrypting, by the client, the encrypted match result to obtain a set of block identifiers representing blocks of records in the database that match the database query;

obtaining, by the client, a block of encrypted records containing match results using only the set of block identifiers;

executing an oblivious transfer protocol between the client and the server to allow the client to obtain at least one key from the server without revealing to the server the encrypted record which the at least one key decrypts;

decrypting, by the client, the match results using the at least one key obtained from the server, resulting in unencrypted match results;

outputting the unencrypted match results to the database query; and enforcing, by the client-server architecture, a query policy that only permits database queries that conform to a set of rules and restrictions mutually agreed upon between the server and the client to ensure secure, privacy-preserving searches of sensitive data.

14. The computer program product as set forth in claim 13, wherein the query policy is provided by the server, and the query policy is used by the client to construct an encrypted database query such that the server verifies that the encrypted database query adheres to the query policy without having to decrypt the encrypted database query.

15. The computer program product as set forth in claim 14, wherein the database query further comprises an unencrypted portion, wherein the unencrypted portion is used by the server to limit a range of the plurality of records to be processed to a smaller number of records.

16. The computer program product as set forth in claim 15, wherein the computer program product further comprises instructions for causing the processor to perform operations of:

identifying, by the server, one or more blocks of records in the database that may contain a match to the database query;

wherein the block identifiers representing the one or more blocks of records are encrypted and sent to the client; and obtaining, by the client, specific record identifiers for records in the one or more blocks of records that match the database query.

17. The computer program product as set forth in claim 16, wherein the client only learns the match results to the database query while learning nothing else about the database, and wherein the server does not learn any information about the database query.

18. The computer program product as set forth in claim 13, wherein the correctness component ensures that the database query will only be matched against the database if the database query adheres to a server's query restriction policy, wherein the cheating and misbehavior detection component ensures that if a server or client sends or requests records other than what matched the database query, cheating and misbehavior will be detected according to a tunable probability, and wherein the privacy component ensures that the client only learns records that match its database query.

* * * * *